(12) United States Patent
Warren

(10) Patent No.: US 7,477,919 B2
(45) Date of Patent: *Jan. 13, 2009

(54) HANDHELD INPUT/OUTPUT DEVICE PROVIDING ENHANCED USER INTERFACE FOR A MOBILE TELEPHONE

(76) Inventor: Peter Warren, 5600 Lake Resort Ter., Apt. 208-H, Chattanooga, TN (US) 37415

(*) Notice: Subject to any disclaimer, the term of this patent is extended or adjusted under 35 U.S.C. 154(b) by 0 days.

This patent is subject to a terminal disclaimer.

(21) Appl. No.: 11/849,454

(22) Filed: Sep. 4, 2007

(65) Prior Publication Data

US 2008/0026794 A1  Jan. 31, 2008

Related U.S. Application Data

(63) Continuation of application No. 11/295,332, filed on Jan. 23, 2006, now Pat. No. 7,266,391.

(51) Int. Cl.
*H04B 1/38* (2006.01)
*H04M 1/00* (2006.01)

(52) U.S. Cl. .............. 455/557; 455/90.1; 455/90.2; 455/550.1; 455/556.1; 455/556.2; 455/566; 455/575.1; 379/93.05; 379/435; 343/702

(58) Field of Classification Search ............. 455/90.1, 455/90.2, 550.1, 556.1, 556.2, 557, 566, 455/575.1; 379/93.05, 435; 343/702
See application file for complete search history.

(56) References Cited

U.S. PATENT DOCUMENTS

| | | | | | |
|---|---|---|---|---|---|
| 5,809,115 | A | * | 9/1998 | Inkinen | 379/93.05 |
| 5,864,708 | A | * | 1/1999 | Croft et al. | 710/1 |
| 5,907,815 | A | * | 5/1999 | Grimm et al. | 455/557 |
| 6,266,539 | B1 | * | 7/2001 | Pardo | 455/556.2 |
| 6,327,482 | B1 | * | 12/2001 | Miyashita | 455/566 |
| 6,597,924 | B1 | * | 7/2003 | Smith | 455/557 |
| 6,628,940 | B1 | * | 9/2003 | Henrick | 455/419 |
| 6,633,759 | B1 | * | 10/2003 | Kobayashi | 455/419 |
| 7,076,270 | B2 | * | 7/2006 | Jaggers et al. | 455/556.1 |
| 7,110,789 | B1 | * | 9/2006 | Curtiss et al. | 455/556.1 |

* cited by examiner

*Primary Examiner*—Stephen M D'Agosta
(74) *Attorney, Agent, or Firm*—Michael J. Mehrman; Mehrman Law Office PC

(57) ABSTRACT

A keyboard and a microphone for inputting information, a display screen and a speaker for viewing or hearing information, and a processor, all mounted to or within a housing in the form of a laptop computer or hand-held computer. A phone interface has a slot, channel, or other support member for holding the portable phone, with a phone port electrically connected to the processor. Alternative embodiments include a modem that is electrically connected to the processor and the phone port, and an adapter with a port that mates with the phone port and a port that mates with a selected phone. The phone wirelessly transmits data entered into the input components and transferred to the phone via the phone port, and wirelessly receives data to be transferred to the output components via the phone port for visual or audible output.

22 Claims, 6 Drawing Sheets

HANDHELD INPUT/OUTPUT DEVICE PROVIDING ENHANCED USER INTERFACE FOR A MOBILE TELEPHONE

REFERENCE TO RELATED APPLICATION

This application is a Continuation Application claiming priority to U.S. patent application Ser. No. 11/295,332 filed on Jan. 23, 2006, now U.S. Pat. No. 7,266,391 which is incorporated herein by reference. Application Ser. No. 11/295,332 claims priority to U.S. patent application Ser. No. 10/247,661, now U.S. Pat. No. 6,999,792.

TECHNICAL FIELD

This invention relates to portable electronic devices for communicating with remote computers and, more particularly, to an input-output device with a universal port for connecting to a cell phone that wirelessly communicates with remote computers.

BACKGROUND OF THE INVENTION

Technological advances in the telecommunications and computer-related industries have provided cell phones, web phones, personal digital assistants (PDA's), hand held computers, laptop computers, and other portable devices that allow for instant communication and remote access to information. These portable devices generally have proven to be very beneficial because they allow people to stay connected wherever they are.

For example, laptops are great for remotely accessing information on another computer or network (e.g., the Internet) and sending/receiving email messages, in addition to their primary function as portable information processors. However, they have to be connected to a phone (or cable or other) jack, and they tend to be rather bulky, heavy, and expensive. Therefore, laptops are not ideal for carrying around on a routine basis (relative to cell phones) for instant communication and remote access to information.

On the other hand, cell phones are small, light weight, and convenient to carry around, relative to laptops. In an effort to realize the full potential of both the Internet and wireless connectivity, some cell phones are now provided with capabilities for wirelessly accessing the Internet. Web phones, as they are sometimes called, are configured with wireless application protocol (WAP) for browsing and viewing web pages (or portions or reformatted versions thereof), for sending, receiving, and viewing email messages, and so forth.

Web phones have been available since the late 1990's yet have not been overly commercially successful. Drawbacks to web phones include the difficulty in reading the small screen on the phone, the difficulty in using the small keypad on the phone to enter data and control the Internet functions of the phone, and the increased weight and size of the phone from the added web access features.

Accordingly, there remains a need in the art for a portable wireless device that permits instant communication and remote access to information, that is sufficiently small and lightweight that it can be conveniently carried around by a user on a routine basis, and that permits the user to easily enter information such as a web site address or an email message, to easily control the device to browse the web or send an email message, to easily view web pages and email messages, and to easily access information stored on a home or other remote computer.

SUMMARY OF THE INVENTION

The present invention fulfills these and other needs by providing an input/output device having a phone port for connecting to a cell or other portable phone. The device has input components (such as a keyboard) and output components (such as a screen), which are much easier to use than the mini-keypad and mini-screen on typical web phones. A person uses the keyboard to input information or commands. Then signals representing the information or commands are sent to the portable phone via the phone port, and the phone transmits wireless signals to the intended computer, phone, etc. Similarly, the phone receives wireless signals and sends the signals to the device via the phone port. Then the text and/or images represented by the signals are displayed on the screen.

Generally described, the input/output device includes a housing for one or more input components such as a keyboard and/or microphone, one or more output components such as a display screen or a speaker, a data storage device such as a hard drive, a processor, and a phone interface. Also, a modem can be provided for use with a portable phone without one. The data storage device has a browser, email, and wireless application protocol programming stored therein. The phone interface has a support member for the portable phone and the aforementioned port. The phone wirelessly transmits data entered into the input components and wirelessly receives data to be displayed or audibly output by the output components.

In a first exemplary embodiment of the invention, the housing has the shape and size of a conventional laptop computer. The support member is formed by a frame mounted to the housing and having a bottom (or side) wall with the port disposed thereon. The frame can be solid, perforated, latticed, or have another construction. The port has two male connectors that insert into two female connectors in the phone. The number, shape, and size of the connectors can be selected as desired. Elastic members can be provided in the frame to snugly receive different sized portable phones, and adapters can be provided for connecting to different connector arrangements of different types of phones.

In a first alternative embodiment, the support member is formed by a frame that is pivotally mounted to the housing at an opening, so that the frame pivots into and out of the housing opening. In a second alternative embodiment, the support member is formed by a slot in the base housing section. Similarly, in a third alternative embodiment, the support member is formed by a slot in the pivotal housing section.

In a fourth alternative embodiment, the support member is formed by a base plate that is slidably attached to the housing at an opening so that the base plate slides into and out of the housing. Additionally, a slidably retractable arm can be attached to the housing at an opening so that the arm slides out of the opening to laterally support the phone. Similarly, in a fifth alternative embodiment, the support member is provided by a base plate that is pivotally mounted to the housing at an opening so that the base plate pivots into and out of the housing, and a pivotally retractable arm can be attached to the housing at an opening so that the arm pivots.

In a second exemplary embodiment, the housing has the shape and size of a conventional hand-held computer. The housing has a slot or channel for receiving the portable phone, with the support member formed by one of the walls defining the slot or channel. Of course, support members similar to those of the first exemplary embodiment alternatively can be provided. In a third exemplary embodiment, the housing and slot (or channel) are similar to that of the second embodiment, plus an adapter sleeve is provided. The adapter sleeve receives and holds the phone so that the phone can be slid into and out of the sleeve (and the slot) as desired.

Accordingly, the input/output device of the present invention provides numerous advantages over the prior art. For example, a user can easily enter information (such as a web site address or an email message) by the keyboard (instead of by a mini-keypad of a web phone), easily view text and/or graphics (from web pages or email messages) on the screen (instead of on a mini-screen of a web phone), and easily access information (such as appointment calendar entries) stored on a home or other remote computer. In order to communicate with the desired computer(s), phone, etc., the user merely inserts his or her portable phone into the phone interface so that the phone engages the port, and the phone sends and receives wireless signals to accomplish the communication. When the user removes the phone from the device, the phone then returns to functioning as a conventional portable phone. In this way, the input/output device can be sufficiently small, lightweight, and inexpensive that it can be conveniently carried around on a routine basis for use when desired.

The specific techniques and structures employed by the invention to improve over the drawbacks of the prior systems and accomplish the advantages described above will become apparent from the following detailed description of the embodiments of the invention and the appended drawings and claims.

DETAILED DESCRIPTION OF THE EXEMPLARY EMBODIMENTS

Figure 1:
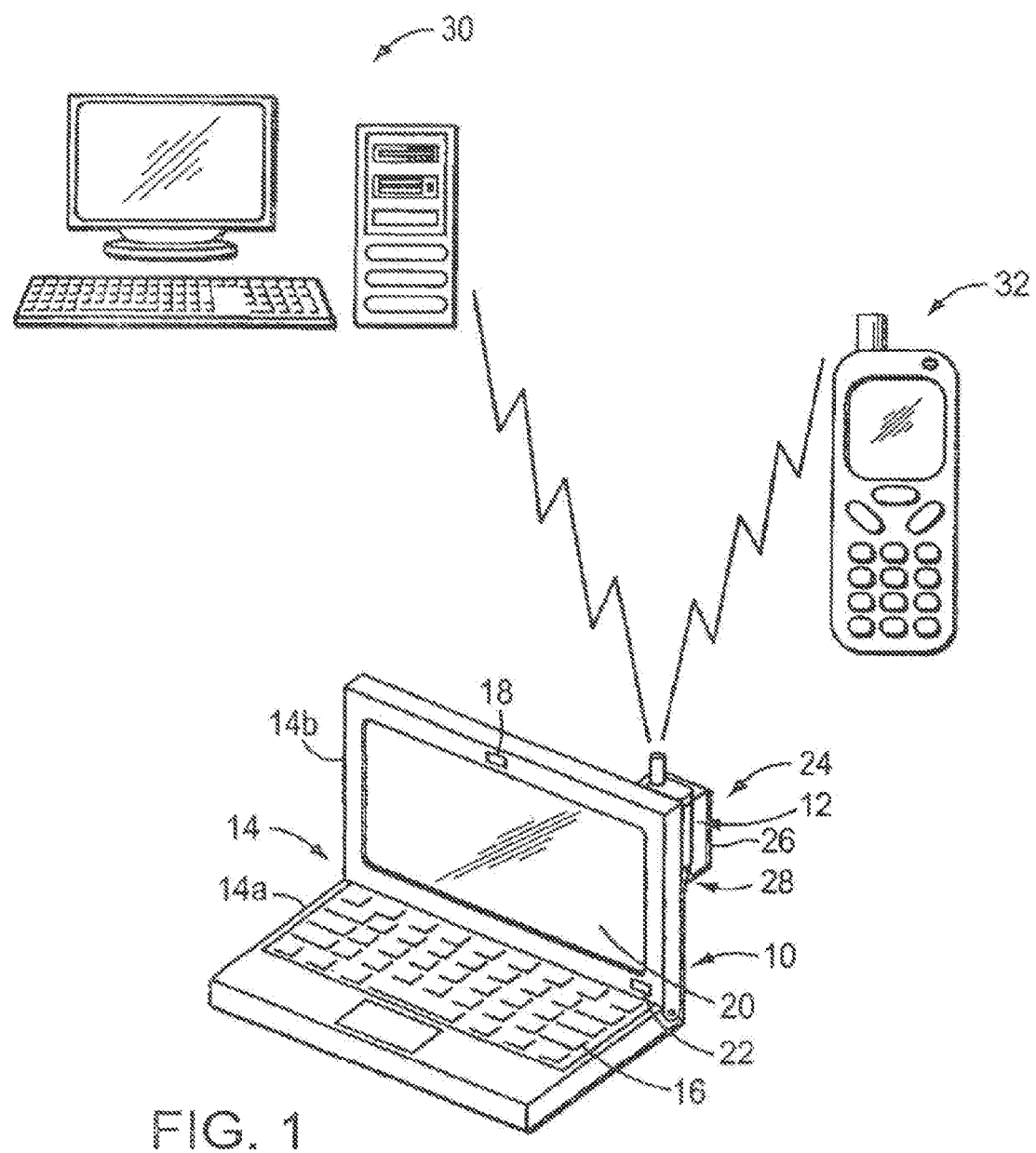
FIG. 1 is a perspective view of a first exemplary embodiment of an input/output device of the present invention in use with a cell phone to communicate with a computer and another cell phone.

FIG. 1 shows a first exemplary embodiment of the present invention, referred to generally as the input/output device 10, in use with a portable phone 12. The device 10 includes a housing 14 that has a base section 14a and a pivot section 14b pivotally connected together. The housing 14 can be made of a plastic, fiberglass, metal, or other material, with a shape and size smaller than or comparable to a laptop and larger than or comparable to a hand held computer. In this fashion, the housing 14 provides a protective case for the components of the device 10.

The device 10 has one or more input components and one or more output components mounted to the housing 14 or enclosed in the housing and accessible through openings therein. For example, the input components can be provided by a keyboard 16 and/or a microphone 18, and the output components can be provided by a display screen 20 and/or a speaker 22. Of course, a pointer device, stylus, touch screen, keypad, and/or other input and/or output components can be provided. It will be understood that these components can be provided by commercially available components well known in the art.

Additionally, the device 10 includes a phone interface 24 having a support member 26 that supports the portable phone 12 and a port 28 for communicating with the phone. Utilizing these features, a user much more easily can use their cell (or web) phone to communicate with and remotely access information on another computer (or network of computers such as the Internet) 30, another portable phone 32, or other electronic devices.

For example, the user can be engaged in a conversation on his portable phone 12, and simply insert the phone into engagement with the phone interface 24 to bring up a web page or to view other data on the display screen 20 of the device 10. When desired, then the user simply removes the phone from the interface and resumes using the phone as a conventional portable phone. Also, the user can utilize the keyboard 16 or another input component of the device 10 to enter data such as a web site address, an email message, personal identification information for making an online purchase, or a file location on a remote computer, or to enter control functions such as page scrolling or sending the email message, instead of having to use the mini keypad on conventional web phones. The device 10 processes the entered data or command and communicates with the portable phone 12 via the port 28. The phone 12 in turn wirelessly transmits signals representing the data or command to the intended computer(s) 30, phone 32, or other electronic device.

Similarly, the phone 12 receives wireless signals from another computer(s) 30, phone 32, and so forth, and communicates the signals to the device 10 via the port 28. The device 10 then processes the signals and outputs the data visually on the display screen 20, audibly through the speaker 22, or otherwise. In this way, the outputted text and/or images of web pages, email messages, etc. can be seen more clearly and easily than when using the mini display screen on conventional web phones. Additionally, users can remotely access documents, check their schedules, or retrieve other information stored on their home and/or office computers.

Accordingly, users can carry their cell phones as they normally do and, when needed, use the input/output device 10 to easily access information and/or features on their home computer from elsewhere, their office computer from home, the Internet from anywhere, and so forth. The device 10 is lightweight, compact, and inexpensive relative to a laptop computer, so it can be carried around routinely like a cell phone, if so desired. Also, users can keep additional devices 10 where they are likely to need them, for example, in their briefcase or business bag, automobile, office, boat, vacation home, etc. Furthermore, users can affordably obtain several of the devices 10 and configure them in a network in their home with, for example, one device upstairs, one downstairs, one in the kitchen, etc., each able to communicate with a main computer in the house (and/or with each other when someone inserts their cell phone into the phone interface). Additionally or alternatively, a host of the devices 10 can be provided in restaurants, cafes, bars, airports, airplanes and jets, trains, taxicabs, hotels, and so forth, for use as needed by persons carrying cell phones.

The device 10 can be used with most any type of portable phone 12. As used herein, a portable phone is any analog, digital, third generation, and/or other portable telephone or other telecommunications device. In order to function with the device 10, the portable phone 12 may need to be adapted to include modified circuitry and a mating connector, for example, a female connector for mating with a male connector of the port 25. Such adaptations can be readily made to provide a portable phone that cooperatively functions with the device 10 as described herein.

Furthermore, the device 10 can be used to communicate with most any type of electronic device that is connected to a phone or cable line or that sends and/or receives wireless signals. Thus, while the device is described herein for communication with computers 30 and cell phones 32, it also can be used to remotely control, retrieve information from, or otherwise communicate with PDA's, household appliances, portable or stationary televisions, portable or stationary radios, compact disc and tape players, and/or other electronic devices modified to include a phone or cable line connection and/or a wireless transmitter and/or receiver operating within the designated frequency range for portable phones.

Figure 2:
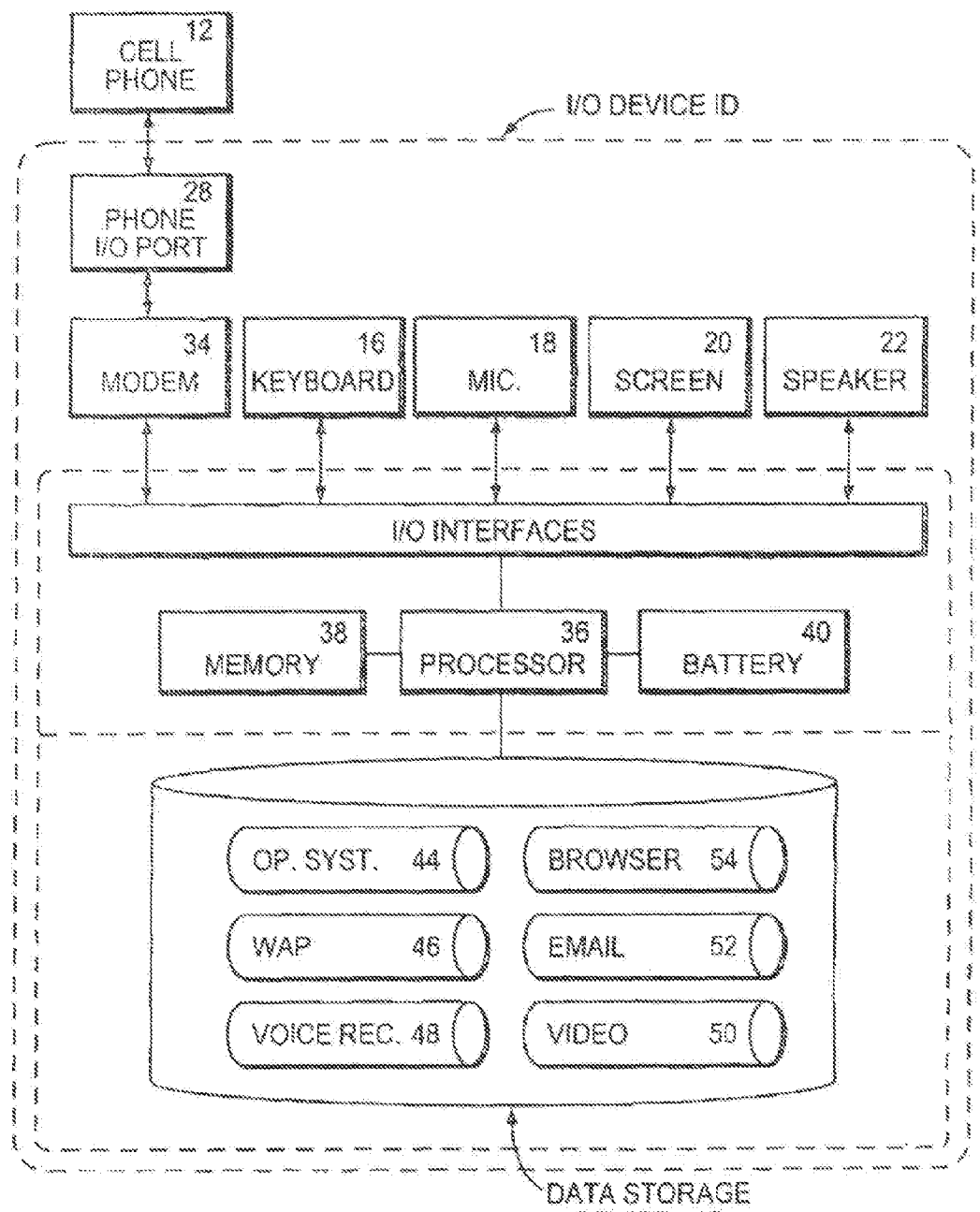
FIG. 2 is a schematic diagram of the input/output device of FIG. 1, showing the main internal components of the device.

FIG. 2 schematically shows the configuration of the components of the input/output device 10, including the keyboard 16, microphone 18, screen 20, speaker 22, and phone port 28. The phone port 28 is connected to a modem 34 that encodes the entered data for transmission by the phone 12, for use with a portable phone without a modem. The modem can be provided by a modem card, an internal modem, or another conventional modem. Alternatively, the device 10 can be provided without the modem, for use with a portable phone 12 that has a modem. Also, a dial tone generator can be provided, as needed.

A processor 36 is connected to the modem 34, a memory device 38 (for example, RAM), a power supply 40 (for example, batteries), and a data storage device 42 (for example, a hard drive) via input/output interfaces. The data storage device 42 includes an operating system 44 for instructing the processor 36 to run the components of the device 10, WAP software 46 for sending and receiving web pages, programs for voice recognition 48 and video 50 (included if the device has the microphone and the screen, respectively), and application programs such as an email program 52 and a browser 54. The processor 36 can be programmed to turn on the device 10 when the phone port 28 is connected to a port on the portable phone 12, and to turn off the device upon disconnection. It will be understood that these components can be provided by commercially available components well known in the art.

In this configuration, the device 10 has minimal on-board functionality. The device 10 need only include components for inputting and outputting information and for communicating the information to and from the portable phone 12. Thus, the device does not need word processing, spreadsheet, or other common application programs, and can be provided with a correspondingly smaller (and lighter) data storage device, memory device, batteries, and housing. Accordingly, the device 10 can be produced for a low cost and with a small size and weight, relative to laptops.

The device 10 can be provided with additional features and/or in alternative configurations, as desired. For example, the hard drive 42 can be provided without the WAP software 46, email 50, or browser 52 if the device is to be used with a web phone including these components, the video program 50 can be provided by a video card, the hard drive 42 can be provided by a disc drive, optic drive, CD-ROM, and/or another drive, and/or the power supply can be provided by a detachable power cord for connection to 120/240v line source, by photovoltaic cells, by combinations thereof, and so forth. Also, the device 10 can have additional input/output interfaces for connecting additional components such as a printer, scanner, backup storage device, and so forth. Furthermore, the device can be provided with a wireless transmitter and receiver and BLUETOOTH or another wireless communications software for use with, for example, a wearable communications device such as the eyeglasses disclosed in U.S. patent application Ser. No. 09/888,280.

Figure 3:
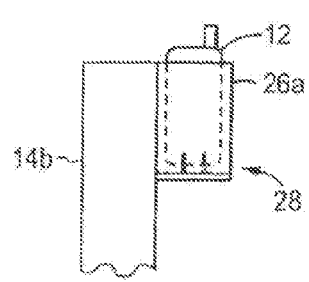
FIG. 3 is a side detail view of a phone interface of the input/output device of the FIG. 1, showing a support member for the cell phone in the form of a frame.
Figure 4:
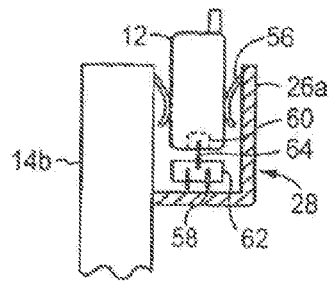
FIG. 4 is a cross sectional detail view of the support member of FIG. 3, showing an adapter connected to phone ports connected to the cell phone.
Figure 5:
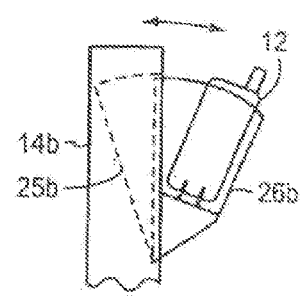
FIG. 5 is a side detail view of a first alternative embodiment of the support member in the form of a pivotal frame.

FIGS. 3 and 4 show the support member 26 for the portable phone 12, with the support member formed by a frame 26a. The frame 26a has side walls and a bottom wall that define a receptacle for the phone, and is mounted to the pivotal housing section 14b. The frame 26a can be generally rectangular with an open top and a size selected for receiving and holding any of the various different sizes of phones 12 that are commercially available. Alternatively, the frame 26a can have other regular or irregular shapes with the frame walls provided by solid, perforated, lattice, wire, or flanged members, or other structures that will receive and hold the phone 12. It will be understood that instead of a frame, the support member can have the form of a bracket, plate, arm, sleeve, shelve, bottom or side wall of a slot, pocket, or other receptacle, or another structure that supports the portable phone.

Additionally, two or another number of elastic members 56 can be attached to or otherwise arranged within the frame 26a for adjusting the size of the receptacle to snugly hold the phone in place. Accordingly, the elastic members 56 can be provided by leaf springs, spring-biased runners, a bellows, elastomeric arms or bushings, or other structures.

The port 28 has two conventional male connectors 58 that extend from the bottom wall of the frame 26a and insert into two conventional female connectors 60 of the phone 12. The connectors 58 can be sized and spaced to be universal for mating with the connectors 60 on any cell phone. Of course, another number of connectors can be provided, and the female connectors can be provided on the device with male connectors on the phone, as may be desired. Alternatively, the port can include a wireless transmitter and a wireless receiver that send and receive radio or other frequency signals to and from the portable phone (with the hard drive including BLUETOOTH or another communications software), or the port can be provide by an infrared or other optical transmitter and receiver for communicating with similar components on a modified portable phone.

In order for the device 10 to accommodate different brands and types of phones, one or more adapters 62 can be provided that mate with the connectors 58 of the device 10. Each adapter 62 has connector(s) 64 with a number, length, spacing, and cross sectional shape and size selected for mating with the particular connectors of the phone to be used. In this manner, when the user upgrades or for another reason obtains a new cell phone with connectors that do not mate, he or she can continue to use the device by simply obtaining an adapter for that particular new phone. Also, for phones with similar connector arrangements, one adapter can be configured for use with several different brands or types of phones.

FIGS. 5-9 show several of the contemplated alternative embodiments of the support member 26 for the portable phone 12. In a first alternative embodiment shown in FIG. 5, the support member is provided by a frame 26b that forms a receptacle for the phone and that is pivotally mounted to the housing 14b at an opening 25b therein. The port connectors are disposed on the bottom (or another) wall of the receptacle. The frame 26b pivots between an open position extending from the housing so that the phone 12 can be inserted into the receptacle and a closed position retracted into the housing opening 25b.

Figure 6:
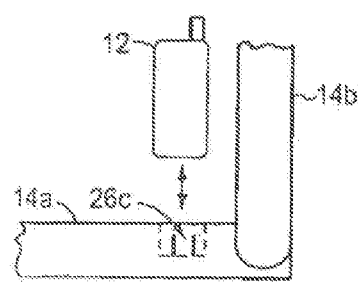
FIG. 6 is a side detail view of a second alternative embodiment of the support member in the form of a slot in the base housing section.
Figure 7:
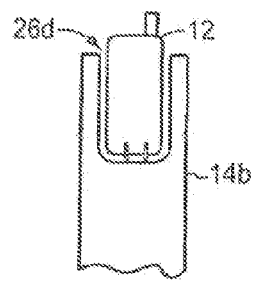
FIG. 7 is a side detail view of a third alternative embodiment of the support member in the form of a slot in the pivotal housing section.

In a second alternative embodiment shown in FIG. 6, the support member is provided by walls defining a slot 26c in the base housing section 14a, and the port connectors are disposed on the bottom (or another) wall of the slot. Similarly, in a third alternative embodiment shown in FIG. 7, the support member is provided by walls defining a slot 26d in the pivotal housing section 14b, and the port connectors are disposed on the bottom (or another) wall of the slot.

Figure 8:
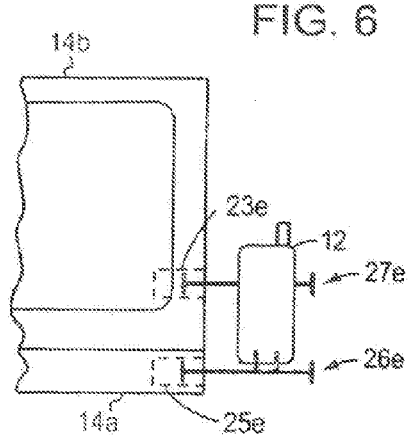
FIG. 8 is a front detail view of a fourth alternative embodiment of the support member in the form of a linearly retractable base plate and lateral support arm.

In a fourth alternative embodiment shown in FIG. 8, the support member is provided by a base plate 26e that is slidably attached to the housing 14a at an opening 25e therein. The port connectors are disposed on the top surface of the base plate 26e. The base plate 26e slides between an open position extending from the housing so that the phone 12 can be placed on the base plate engaging the connectors and a closed position slidably retracted into the housing opening 25e. A spring-loaded latch or the like can be provided for releasing and urging the base plate 26e to move to the open position. Additionally, a retractable arm 27e can be slidably attached to the housing 14b at an opening 23e therein. The arm 27e slides between an open position extending from the housing and laterally supporting the phone and a closed position slidably retracted into the housing opening 23e.

Figure 9:
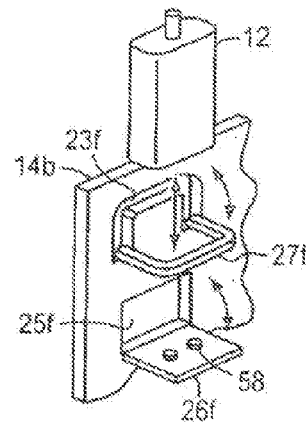
FIG. 9 is a perspective view of a fifth alternative embodiment of the support member in the form of a pivotally retractable base plate and lateral support arm.

Similarly, in a fifth alternative embodiment shown in FIG. 9, the support member is provided by a base plate 26f that is pivotally mounted to the housing 14b at an opening 25f therein. The port connectors are disposed on the top surface of the base plate 26f. The base plate 26f pivots between an open position extending from the housing so that the phone 12 can be placed onto the base plate and a closed position pivotally retracted into the housing opening 25f. Additionally, a retractable arm 27f can be pivotally attached to the housing 14b at an opening 23f therein. The arm 27f pivots between an open position extending from the housing and laterally supporting the phone and a closed position pivotally retracted into the housing opening 23f.

Figure 10:
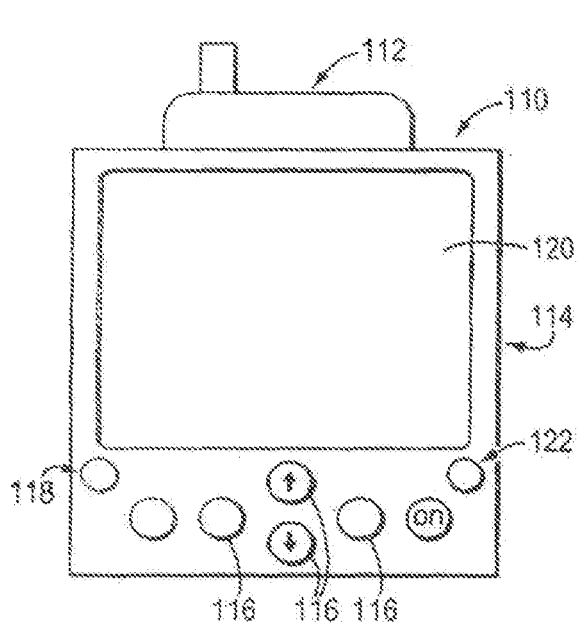
FIG. 10 is a front detail view of a second exemplary embodiment of an input/output device of the present invention in use with a cell phone.
Figure 11:
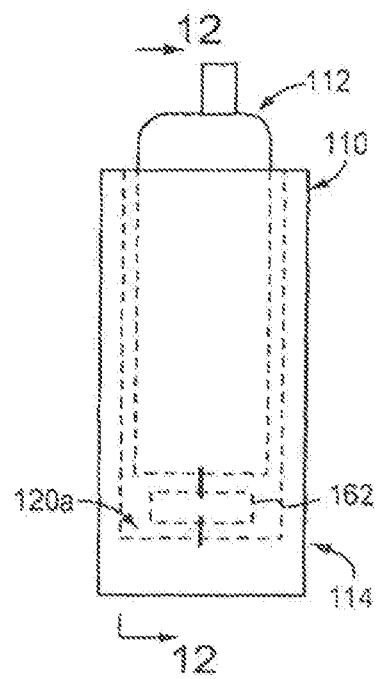
FIG. 11 is a side view of the input/output device of the FIG. 10, showing the support member provided by a slot in the housing.
Figure 12:
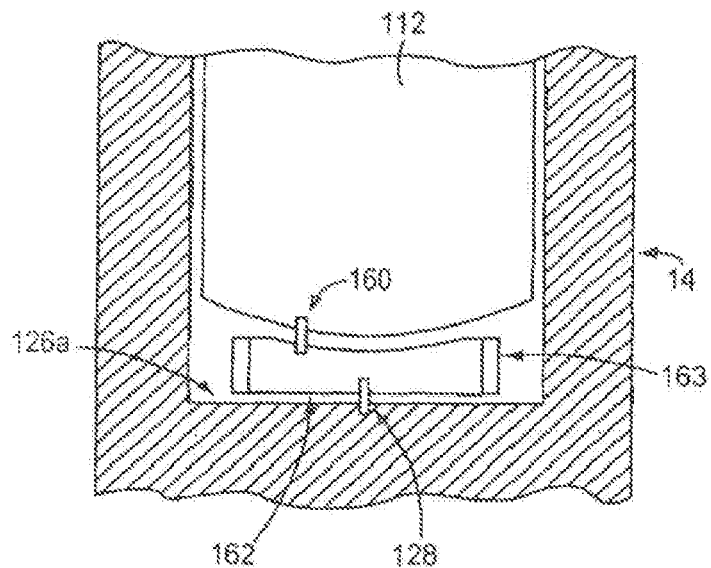
FIG. 12 is a cross sectional detail view taken at line 12-12 of FIG. 11, showing the phone connected to the input/output device by an adapter.

Referring now to FIGS. 10 and 11, there is shown a second exemplary embodiment of the present invention, referred to generally as the input/output device 110, for use with a portable phone 112. The input/output device 110 has internal electronic components similar to those of the first exemplary embodiment described above. In this embodiment, the housing 114 has a touch screen for entering and outputting data, and function buttons 116 for operating the device 110. Additionally, a microphone 118, a speaker 122, and/or other input/output components can be provided, as desired.

The housing 114 has the shape and size of a conventional hand-held computer. For example, the housing 14 can be similar to that of a PDA such as a BLACKBERRY® PDA, PALM® PDA, VISOR® PDA, POCKET PC® PDA, or another electronic device that can be held in the user's hand when in use. In this manner, the input/output device 110 can be used anywhere, anytime, such as when walking down the street or exercising on a stationary bicycle. The support member 126a is formed by a wall defining a slot in the housing 114 for receiving the portable phone 112, with the phone port 128 positioned on the support member 126a. Accordingly, the phone 112 can be slid into and out of the slot to engage the phone port 128. For thinner portable phones, the housing and slot also can be thinner.

Additionally, an adapter 162 can be provided for connecting the phone port 128 to a modem port 160 or other port on a selected portable phone 112. Thus, the adapter 162 can have two male connectors with one connector received by a female connector of the phone port 128 and the other connector received by a female connector of the modem port 160. Alternatively, similar to the first exemplary embodiment, the adapter 160 can have female connectors and the modem and phone ports can have male connectors, or other configurations can be provided with other types, numbers, sizes, shapes, and positions of connectors. Also, the adapter 160 can have a curved top surface that forms a cradle for a portable phone with a curved bottom. Additionally, two (or another) retainers 163 can be coupled to the housing inside the slot for securing the adapter 162 therein. Such retainers 163 can be provided by clips, straps, bands, screws, latches, or the like.

Figure 13:
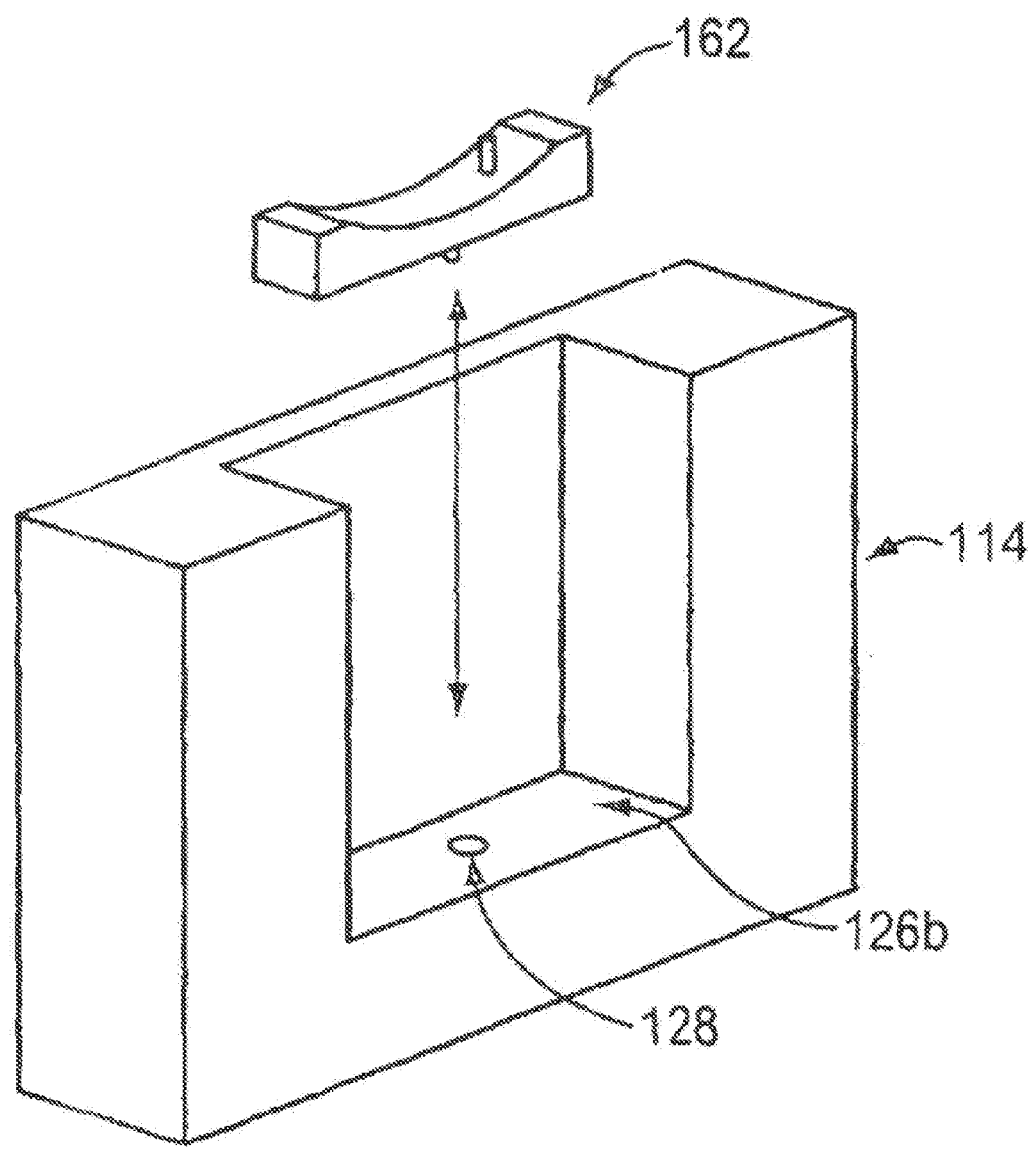
FIG. 13 is a rear perspective view of an alternative embodiment of the input/output device of FIG. 10, showing the support member provided by a channel in the housing.

Referring to FIG. 13, in an alternative embodiment, the support member 126b is formed by a wall defining a channel in the housing 114 for receiving the portable phone 112, with the phone port 128 positioned on the support member 126b. Additionally, a retractable arm can be provided that is pivotally, slidably, or otherwise mounted to the housing 114 (similar to the arm 27c of FIG. 9), for supporting the phone in the channel. Of course, other support members similar to those of the first exemplary embodiment alternatively can be provided.

Figure 14:
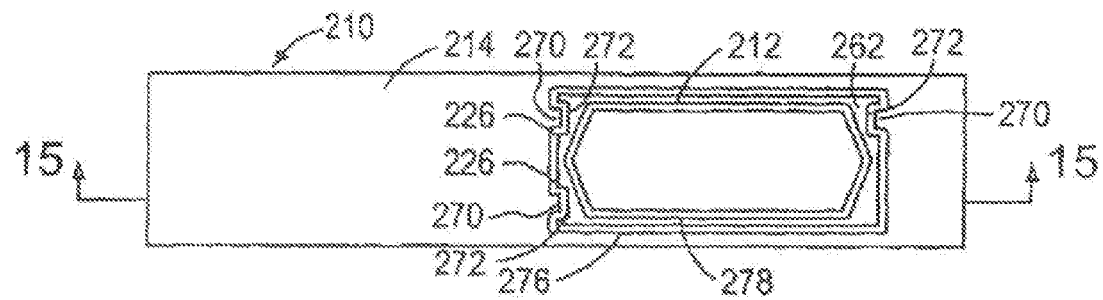
FIG. 14 is a top plan view of a third exemplary embodiment of the input/output device of the present invention, showing the support member provided by a slot in the housing and an adapter sleeve for the phone.
Figure 15:
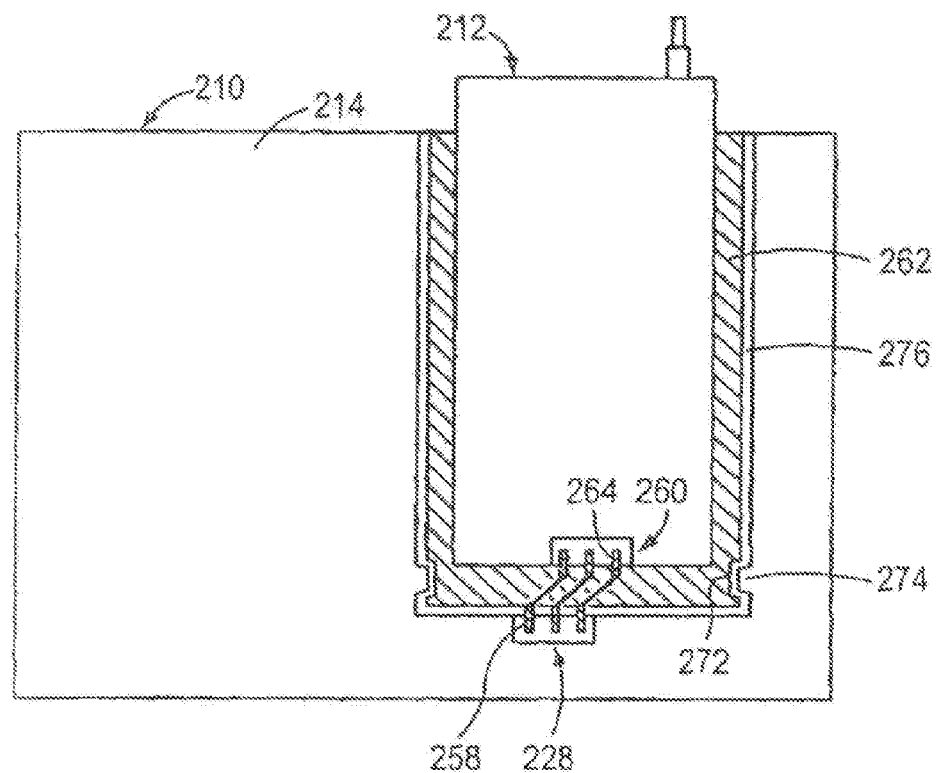
FIG. 15 is a cross sectional view of the input/output device of FIG. 14 taken at line 15-15, showing the configuration of the slot, sleeve, and phone.

Referring now to FIGS. 14 and 15, there is shown a third exemplary embodiment of the present invention, referred to generally as the input/output device 210, for use with a portable phone 212. The input/output device 210 has internal electronic components similar to those of the first and second exemplary embodiments described above. The support member 226 is formed by a wall defining a slot in the housing 214 for receiving the portable phone 212, with the phone port 228 positioned on the support member 226. Of course, other support members similar to those of the first or second exemplary embodiment alternatively can be provided.

In this embodiment, an adapter sleeve 262 slides into and out of the slot, and receives and holds the phone 212 so that the phone can be slid into and out of the sleeve. The adapter sleeve 262 can have a shape and size for receiving the phone, and can be substantially coextensive with the slot (meaning that the adapter sleeve extends most of the length of the lost, but does not extend out of the slot). The adapter sleeve 262 and slot have one or more mating tongues and grooves that permit the adapter sleeve to slide into and out of the housing 214. As depicted, for example, three tongues 270 extend from the adapter sleeve 262 into three grooves 272 in the slot wall. Alternatively, the tongues can extend from the slot wall and the grooves can be formed in the adapter sleeve. The tongues 270 can be provided by tabs, wedges, pins, bars, or the like. Also, the adapter sleeve 262 has two (or another number) of notches 274 that receive two (or another number) of protrusions 276 extending from the slot wall for retaining the adapter sleeve 262 in the slot when the phone is pulled out of the adapter sleeve.

Additionally, the adapter sleeve 262 connects the phone port 228 to the modem port 260 (or to another port on the selected portable phone). Thus, the adapter sleeve 262 can have a first port with three male connectors 258 that extend from it and are received by female connectors of the phone port 128, and a second port with three male connectors 264 that extend from it and are received by female connectors of the modem port 160. The male connectors 258 and 262 are electrically connected so that the phone 212 can be connected to the phone port 228 through the ports of the adapter sleeve 262. Alternatively, similar to the first and second embodiments, the adapter sleeve 260 can have female connectors and the modem and phone ports can have male connectors, or other configurations can be provided with other types, numbers, sizes, shapes, and positions of connectors.

The adapter sleeve 262 can be dimensioned to loosely fit into the slot and to loosely receive the phone 212, thereby forming air-gaps for dissipating heat from the phone. For example, an air-gap 276 can be provided between the phone 212 and the sleeve adapter 262, and an air-gap 278 can be provided between the sleeve adapter and the slot wall. Also, apertures can be formed in the wall of the adapter sleeve for increasing the heat dissipation. Accordingly, the phone 212 can be slid into and out of the adapter sleeve 262 to engage the phone port 228. In this way, the adapter sleeve 262 is selected with the connector arrangement and internal dimensions for the particular phone 212 to be used, and a new sleeve would only be needed when the user obtains a different portable phone.

In view of the foregoing, it will be appreciated that input/output device of the present invention permits the user to insert his or her portable phone into the phone port and easily enter information (such as a web site address or an email message) by the keyboard or touch screen (instead of by a mini-keypad of a web phone), easily view text and/or graphics (from web pages or email messages) on the screen (instead of on a mini-screen of a web phone), and easily access information stored on a home or other remote computer (such as appointment calendar entries). Thus, when the phone is inserted into the input/output device, the phone provides connectivity to the device by functioning as a modem and/or wireless communications device providing real time communications capabilities with other communications devices. Then the user can slide his portable phone out of the input/output device and the phone resumes operation as a conventional portable phone.

In this manner, the portable phone serves the dual functions of conventional phone when not engaged with the phone interface and a modem and/or a wireless communications device when so engaged. Therefore, only one cell phone account is needed, there are no dangling wires between the phone and the device, and the user only has one communications device to hold when using the phone in conjunction with the input/output device. Furthermore, the input/output device is sufficiently small, lightweight, and inexpensive that it can be conveniently carried around on a routine basis for use when desired.

While certain embodiments are described above with particularity, these should not be construed as limitations on the scope of the invention. It should be understood, therefore, that the foregoing relates only to exemplary embodiments of the present invention, and that numerous changes may be made therein without departing from the spirit and scope of the invention as defined by the following claims.

The invention claimed is:

1. An input/output device for a mobile telephone providing a handheld, wirelessly portable, enhanced user interface for the mobile telephone having a display screen, comprising:
   a housing sized and configured to be conveniently carried by hand;
   an electronic display screen mounted to or enclosed in the housing that is larger than the display screen on the mobile telephone;
   a user operable input device mounted to or enclosed in the housing for receiving user commands for controlling the mobile telephone while the input/output device is handheld and wirelessly portable;
   a cradle mounted to or enclosed in the housing configured for physically receiving and holding the mobile telephone;
   a communication port mounted to or enclosed in the housing for communicating with the mobile telephone when the mobile telephone is held by the cradle;
   wherein the input/output device is configured to physically hold and transport the mobile telephone while the input/output device is handheld, the input device is used to control the mobile telephone, and the enlarged display screen displays information supplied by the mobile telephone; and
   wherein the mobile telephone input/output device holding the mobile telephone is configured to be conveniently operated while handheld and used as an integrated wireless communication device in which the mobile telephone engages in wireless communications while the input/output device operates as a handheld, wirelessly portable, enhanced user interface for the mobile telephone.

2. The mobile telephone input/output device of claim 1, wherein the input/output device is dedicate to functioning as an enhanced user interface for the mobile telephone when the mobile telephone is held in the cradle.

3. The mobile telephone input/output device of 2, further comprising a data storage device, a processor, and a phone interface dedicated to enhancing the operation of the mobile telephone when the mobile telephone is held in the cradle.

4. The mobile telephone input/output device of claim 3, wherein the user operable input device comprises the display screen for the input/output device, which comprises a touch screen operable for controlling the mobile telephone when the mobile telephone is held in the cradle.

5. The mobile telephone input/output device of claim 3, wherein the user operable input device comprises function buttons dedicated to operating the mobile telephone when the mobile telephone is held in the cradle.

6. The mobile telephone input/output device of claim 1, wherein the user operable input device comprises a keyboard dedicated to inputting information to the mobile telephone when the mobile telephone is held in the cradle.

7. The mobile telephone input/output device of claim 1, wherein the cradle defines a channel for receiving the mobile telephone in a position in which the display screen for the mobile telephone is concealed by the input/output device.

8. The mobile telephone input/output device of claim 1, wherein the cradle defines a channel for receiving the mobile telephone in a position in which the mobile telephone is at least 75% concealed by the input/output device.

9. The mobile telephone input/output device of claim 1, wherein the cradle comprises a retracting support movable between an open position and a closed position configured to receive and hold the mobile telephone when in the open position.

10. The mobile telephone input/output device of claim 9, wherein the retracting support is movable to the closed position when mobile telephone is held by the cradle to locate the mobile telephone in a position in which mobile telephone is concealed within the input/output device.

11. The mobile telephone input/output device of claim 9, wherein the retracting support is movable to the closed position when mobile telephone is held by the cradle to locate the mobile telephone in a position in which the mobile telephone is at least 75% concealed by the input/output device.

12. The mobile telephone input/output device of claim 1, wherein the housing defines a front side perimeter within which the enlarged display screen is positioned, a rear side opposing the front side defining a rear side perimeter, and an edge extending between the front side perimeter and the rear side perimeter, and the cradle is configured to support the mobile wireless communication device from the edge of the housing.

13. The mobile telephone input/output device of claim 1, wherein housing defines a front side perimeter within which the enlarged display screen is positioned, a rear side opposing the front side defining a rear side perimeter, and the cradle is configured to support the mobile wireless communication device from the rear side of the housing.

14. The mobile telephone input/output device of claim 1, further comprising:
   a contact electrically connecting the input/output device to the mobile telephone when the mobile telephone is held in the cradle; and
   a power source configured to power the input/output device and the mobile telephone when the mobile telephone is held in the cradle.

15. The mobile telephone input/output device of claim 1, further comprising a power supply including one or more power supply devices selected from the group consisting of batteries and photovoltaic cells.

16. The mobile telephone input/output device of claim 15, further configured to receive electric power through an electric power cord attachable to an current line source.

17. The mobile telephone input/output device of claim 1, wherein the communication port comprise a Bluetooth or other wireless communication port operative for transmitting signals between the input/output device and the mobile telephone.

18. The mobile telephone input/output device of claim 1, wherein the cradle is configured to support different types of mobile telephones having different physical configurations and the communication port comprises a universal communication port operative for communicating with the different types of mobile telephones when the different types of mobile telephones are held in the cradle.

19. The mobile telephone input/output device of claim 1, wherein the information displayed on the display screen for the input/output device includes information that is also displayed on the display screen for the mobile telephone or would be displayed on the display screen for the mobile telephone if the mobile telephone was operating independently of the input/output device.

20. A system for operating mobile wireless communication devices comprising:
   a plurality of mobile wireless communication devices, each having a different physical configuration, a display screen for displaying a user interface, and a communication port,
   a display device comprising a universal port for communicating with each mobile wireless communication device when the mobile wireless communication device is located in the universal port, the universal port comprising a communication port and a cradle for physically supporting the mobile wireless communication device from the display device with the communication port of the mobile wireless communication device in functional communication with the communication port of the display device;
   wherein the display device is configured to operate as an enlarged and analogous display screen for each mobile wireless communication device when the mobile wireless communication device is located in the universal port;
   wherein the display screen for the mobile wireless communication device may or may not concurrently display the same information shown on the display device; and
   wherein the cradle comprises a retracting support movable between an open position and a closed position, is configured to receive and support a mobile wireless communication device proximate to the display device when in the open position, and further is configured for retraction to the closed position when the mobile wireless communication device is not received in the retracting support.

21. A mobile wireless communication device and computer system, comprising:
   a plurality of mobile wireless communication devices, each having a different physical configuration, a display screen for displaying a user interface, and a communication port,
   a computer comprising a base portion, a display device pivotally attached to the base portion, and a universal port for communicating with each mobile wireless communication device when the mobile wireless communication device is located in the universal port, the universal port comprising a communication port and a cradle for physically supporting the mobile wireless communication device from the computer with the communication port of the mobile wireless communication device in functional communication with the communication port of the display device;
   wherein the display device of the computer is configured to operate as an enlarged and analogous version of the display screen for each mobile wireless communication device when the mobile wireless communication device is located in the universal port;
   wherein the display screen for the mobile wireless communication device may or may not concurrently display the same information shown on the display device; and
   wherein the display device comprises a display side and a rear side, and the cradle is configured to support the mobile wireless communication devices adjacent to the rear side of the display device.

22. A display device for use with a plurality of different types of mobile wireless communication devices, each having a different physical configuration, a display screen for displaying a user interface, and a communication port, comprising:

a display device comprising a display screen located within a display housing having a peripheral edge adjacent to a peripheral edge of the display screen;

a universal port for communicating with each mobile wireless communication device when the mobile wireless communication device is located in the universal port, the universal port comprising a communication port and a cradle for physically supporting the mobile wireless communication device from the display device with the communication port of the mobile wireless communication device in functional communication with the communication port of the display device;

wherein the display device is configured to operate as an enlarged and analogous display screen for each mobile wireless communication device when the mobile wireless communication device is located in the universal port;

wherein the display screen for the mobile wireless communication device may or may not concurrently display the same information shown on the display device; and wherein the cradle comprises a channel adjacent to the edge of the display housing for receiving the mobile wireless communication device with a first portion of the mobile wireless communication device received within the channel and a second portion of the device extending beyond the edge of the of the display housing.

* * * * *